// United States Patent [15] 3,670,255
De Nicolay et al. [45] June 13, 1972

[54] PHASE-LOCK-STABILIZED SYSTEM FOR GENERATING CARRIER FREQUENCIES USABLE IN MULTIPLEX COMMUNICATION

[72] Inventors: Giuliano De Nicolay; Piero Venturini, both of Milan, Italy

[73] Assignee: Societa' Italiana Telecomunicazioni Siemens S.p.A., Milan, Italy

[22] Filed: Nov. 12, 1970

[21] Appl. No.: 88,535

[30] Foreign Application Priority Data

Nov. 13, 1969 Italy ................................24367 A/69

[52] U.S. Cl. ..................................331/25, 331/1 A, 331/27
[51] Int. Cl. ..........................................................H03b 3/04
[58] Field of Search.........................331/1 A, 18, 25, 27, 60; 325/184; 343/200, 207, 208

[56] References Cited

UNITED STATES PATENTS 3,503,003 3/1970 Grobert ..............................331/27 X
3,550,132 12/1970 Kurth et al. ..........................331/25 X
3,518,567 6/1970 Helgesson ............................331/25 X
3,130,376 4/1964 Ross..................................331/1 A X

*Primary Examiner*—Roy Lake
*Assistant Examiner*—Siegfried H. Grimm
*Attorney*—Karl F. Ross

[57] ABSTRACT

A voltage-responsive carrier-frequency oscillator, with a limited range of adjustability designed to compensate for frequency drifts, works through a frequency divider into a phase comparator also receiving a relatively low base frequency harmonically related to the desired carrier frequency. The output of the phase comparator is fed back to the oscillator to maintain a predetermined phase relationship between the two low frequencies. The phase comparator includes a pair of differentiation circuits, deriving respective pulse trains from these low frequencies, and a flip-flop alternately set and reset by interleaved pulses from the two trains; the integrated output wave of the flip-flop constitutes the feedback voltage controlling the output frequency of the oscillator.

6 Claims, 5 Drawing Figures

*Giuliano De Nicolay*
*Piero Venturini*
INVENTORS.

BY

*Karl F. Ross*

*Attorney*

*Giuliano De Nicolay*
*Piero Venturini*
*INVENTORS.*

BY *Karl G. Ross*
*Attorney*

PHASE-LOCK-STABILIZED SYSTEM FOR GENERATING CARRIER FREQUENCIES USABLE IN MULTIPLEX COMMUNICATION

Our present invention relates to a system for the simultaneous generation of different but harmonically interrelated electromagnetic frequencies serving, for example, as carriers for a multiplex communication system.

The term "harmonically related," as used herein, denotes not only a straight harmonic/subharmonic relationship but also a relationship between two or more frequencies sharing a common base frequency as their greatest common divisor.

Conventional methods of deriving such harmonically interrelated elevated frequencies from a common base frequency include selective filtering of the output of a preferably crystal stabilized reference oscillator (operating, for example, at 4, 12 or 124 kHz) after this output has been distorted in a nonlinear element or network designed to introduce the requisite harmonics.

The general object of our present invention is to provide a method of and a circuit arrangement for the generation and stabilization of a set of relatively elevated carrier frequencies with reference to a relatively low base frequency, harmonically related thereto, without the need for a distorter and with elimination of the relatively complex filters heretofore required.

A more specific object is to provide a system of this character wherein the amplitudes of the generated carrier frequencies are unaffected by variations in the amplitude of the associated base frequency.

These objects are realized, pursuant to the present invention, by the use of a limitedly adjustable oscillator to generate an elevated output frequency which may be identical with a desired carrier frequency or which may yield one or more carrier frequencies by division, multiplication and/or combination (e.g. as described in commonly owned application Ser.No. 36,026 filed by one of us, Piero Venturini, on 11 May 1970). From this output frequency we derive a relatively low related frequency, usually but not necessarily a subharmonic (and referred to hereinafter, for convenience, as such), on the order of magnitude of a base frequency, itself harmonically related to the aforementioned output frequency at the mean or rated value thereof. We then feed these two relatively low frequencies to a phase comparator to produce a control variable (generally a voltage) as a function of any phase difference therebetween, this control variable being applied to the adjustable oscillator in a sense tending to maintain that phase difference at a predetermined magnitude whereby the two compared frequencies are synchronized with concurrent latching of the relatively elevated output frequency to the relatively low base frequency.

According to a more specific feature of our invention, the phase comparator includes a pair of differentiation circuits for converting the two identical or closely related input frequencies into respective pulse trains which normally will appear in an interleaved relationship, subject to minor relative shifts due to a drifting of either or both frequency generators. A bistable element or flip-flop is alternately set and reset by respective pulses from these two interleaved trains, the output of this flip-flop being therefore a rectangular wave whose pulse width varies with the relative phase of the two incoming pulse trains. Upon integration over a multiplicity of pulse cycles, this wave yields a variable control voltage to be fed back to the adjustable oscillator whose range of adjustability in response to such voltage should slightly exceed the drift range of its output frequency.

If either of the two oscillation generators produces a sine wave rather than a square wave, a squarer should be inserted between that oscillator and the associated differentiator or the first stage of a multistage binary frequency divider, as the case may be.

If the two input frequencies fed to the comparator drift apart to such an extent that the operation of the flip-flop becomes highly irregular, i.e. if that flip-flop remains for relatively long periods in one or the other of its two states of operation, the output of the high-frequency oscillator should be blocked to prevent the transmission of insufficiently stabilized carrier frequencies. For this purpose we prefer to provide in that output a normally open gate (or a normally closed circuit breaker) under the control of a threshold device which responds to a deviation of the control voltage from a predetermined range.

The above and other features of our invention will be described in detail hereinafter with reference to the accompanying drawing in which.

Figure 1:
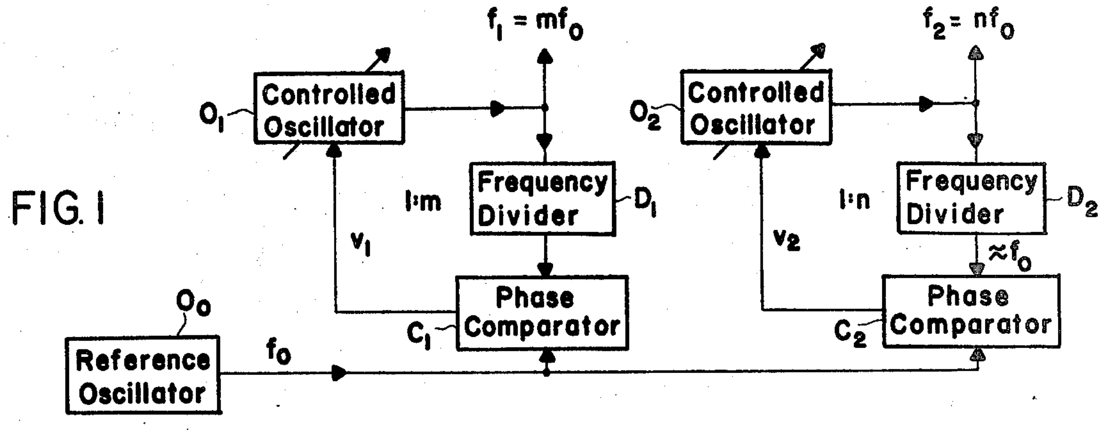
FIG. 1 is a block diagram of a frequency-stabilizing system according to our invention.

In FIG. 1 we have shown a reference oscillator $O_o$ generating a base frequency $f_o$, e.g. of 4 kHz. A controlled oscillator $O_1$ produces a relatively elevated output frequency $f_1 = mf_o$, $m$ being an integer; oscillator $O_1$ is limitedly adjustable to compensate for deviations of its output from the design frequency $f_1$. The output of oscillator $O_1$ is stepped down in a frequency divider $D_1$, in a ratio of 1 : $m$, so that a low-frequency test oscillation having approximately the base frequency $f_o$ appears in the output of the divider. A phase comparator $C_1$ receives the two almost matching frequencies from oscillator $O_o$ and divider $D_1$, respectively, and derives from their phase difference a control voltage $v_1$ fed back to the variable oscillator $O_1$ to adjust its output frequency in a sense tending to maintain a constant phase difference between the two input frequencies of comparator $C_1$.

As further shown in FIG. 1, a second controlled oscillator $O_2$ generates an elevated output frequency $f_2$ whose rated value is equal to $nf_o$, $n$ being an integer different from $m$. A frequency divider $D_2$ reduces this output frequency to approximately the level $f_o$ and works into one input of another phase comparator $C_2$, the second input of this comparator also receiving the base frequency $f_o$ from oscillator $O_o$ to generate a control voltage $v_2$ fed back to oscillator $O_2$ to maintain a substantially constant phase difference in comparator $C_2$. Naturally, any number of controlled oscillators may be associated in this manner with the common reference oscillator $O_o$ to latch their respective output frequencies to the base frequency $f_o$, thereby locking all the carriers constituted by or derived from these output frequencies in step with one another.

Figure 2:
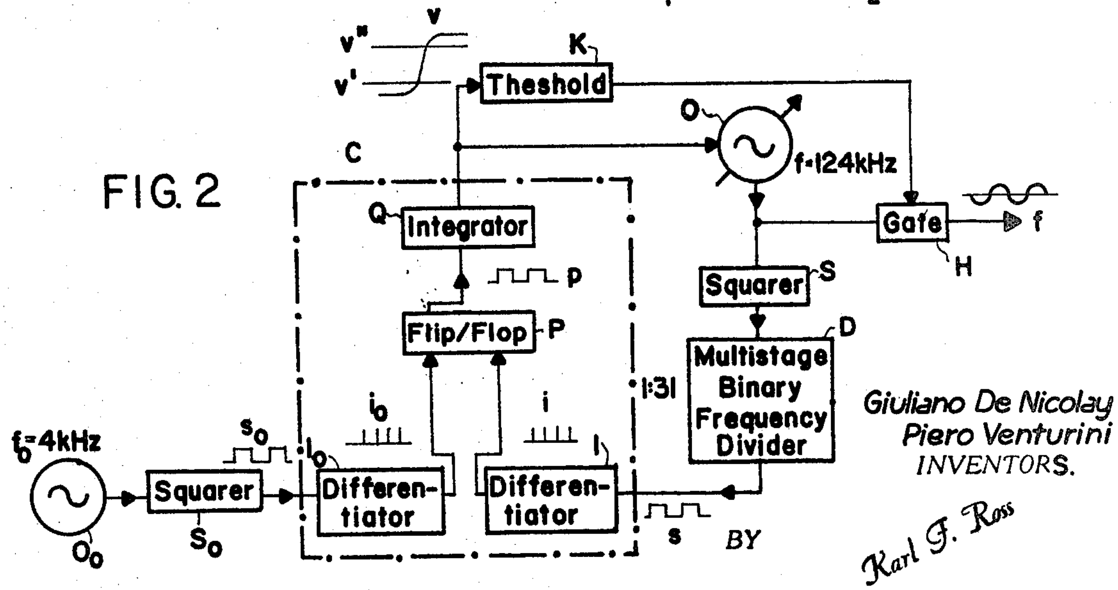
FIG. 2 is a more detailed block diagram of such a system.

FIG. 2 shows details of a phase comparator C which is representative of either of the two comparators $C_1$, $C_2$ of FIG. 1, the controlled oscillators $O_1$, $O_2$ with their dividers $D_1$, $D_2$ having been represented in FIG. 2 by an oscillator O and a divider D. Oscillators $O_o$ and O are both shown as sine-wave generators and work into respective squarers $S_o$ and S, the latter feeding the multistage binary frequency divider D; with oscillator O assumed to have an output frequency $f$ of about 124 kHz, divider D has a step-down ratio of 1 : 31 to generate a test frequency substantially matching the base frequency $f_o$ = 4 kHz.

Comparator C includes two differentiators $I_o$ and I respectively receiving the outputs of squarer $S_o$ and divider D to convert them into respective pulse trains $i_o$ and $i$ here shown to be of positive polarity (with suppression of the intervening negative pulses). Pulse train $i_o$ is fed to a setting input of a flip-flop P whose resetting input receives the pulse train $i$ and whose set output works into an integrator Q, essentially a low-pass filter, generating the control voltage $v$ which is fed back to oscillator O. It will be understood that the tank circuit of this oscillator may include a voltage-responsive impedance, such as a varactor, which in the present case is assumed to increase the output frequency of the oscillator with rising control voltage $v$. This control voltage also reaches a threshold device K which determines whether or not voltage $v$ falls within a range bounded by a lower limit $v'$ and an upper limit $v''$. If voltage $v$ lies outside that range, threshold device K blocks a gate H in the output of oscillator O to prevent the carrier frequency $f$ from reaching its destination.

Figure 3:
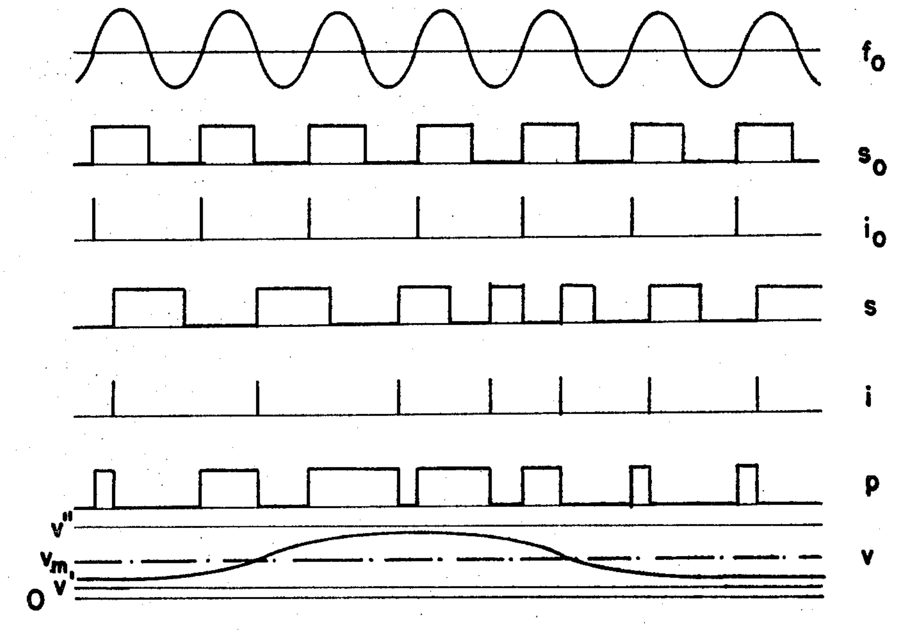
FIG. 3 is a set of graphs relating to the operation of the system of FIG. 2.

Reference will now be made to FIG. 3 for a more detailed discussion of the mode of operation of the system of FIG. 2. This Figure shows the sine wave $f_o$ which, after conversion into a square wave $s_o$ by squarer $S_o$ (FIG. 2), gives rise to a train of equispaced spikes constituting the pulse train $i_o$; the substantial constancy of this pulse spacing is assured by conventional stabilizing means, such as a quartz crystal, in oscillator $O_o$. The second pulse train $i$, derived from a square wave S by the differentiator I of FIG. 2, is of substantially the same cadence as pulse train $i_o$ although the spacing of its spikes is subject to some variation (here exaggerated for the sake of clarity); oscillator O may also be quartz-stabilized to minimize its frequency drift.

Generally, the spikes $i_o$ and $i$ will not coincide so that their trains are interleaved, as shown. With flip-flop P (FIG. 2) alternatively set by a spike $i_o$ and reset by a spike $i$, its output will be a series of rectangular pulses $p$ which after integration in circuit Q (FIG. 2) give rise to the control voltage $v$. As long as the pulses $p$ are widely spaced, voltage $v$ is near its lower operative limit $v'$ which may be slightly above zero; if the pulse spacing is close, the voltage rises toward the upper limit $v''$ of its range which it exceeds whenever the pulses $p$ merge or nearly merge for an extended period, as when the flip-flop P remains continuously set. Such a situation may arise, for example, if the output of divider D or squarer S fails; if the source $O_o$ or its squarer $S_o$ should cease to function, the flip-flop would be permanently reset and the control voltage $v$ would disappear.

It will be seen that the rise of voltage $v$ in response to a lagging of test pulses $i$ with reference to the immediately preceding reference pulses $i_o$ results in a compensatory increase in the frequency of square wave $s$ and that, conversely, the frequency of this square wave is lowered when the pulses $i$, $i_o$ approach each other too closely, the system thus tending to maintain the control voltage $v$ near a mean value $v_m$ corresponding to the precise relationship $f = 31\ f_o$. Naturally, such compensatory adjustment will also occur upon a drifting of base frequency $f_o$.

Figure 4:
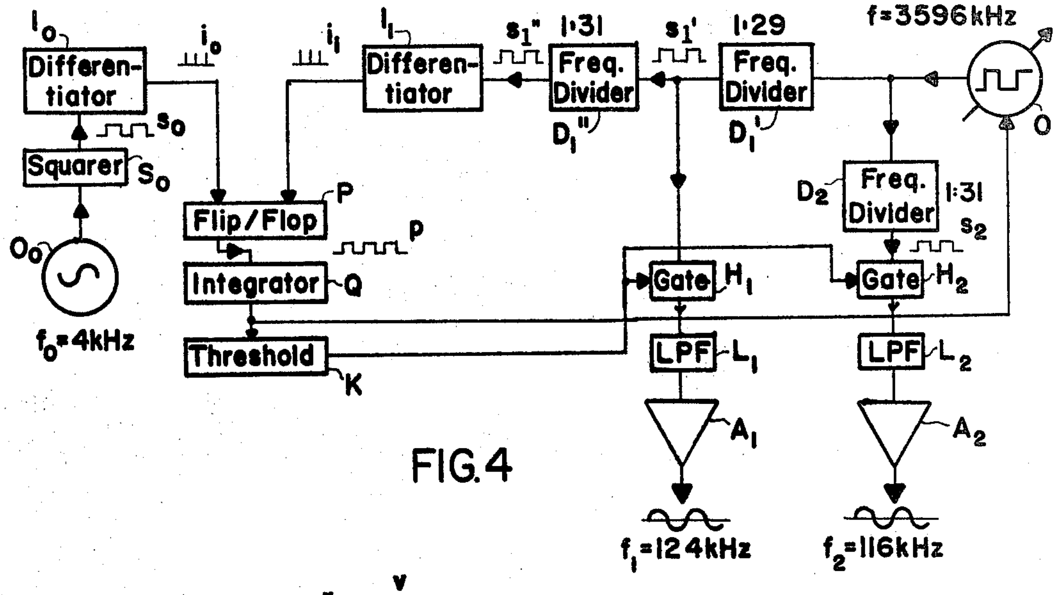
FIG. 4 is a diagram similar to that of FIG. 2, showing a more elaborate system.

According to FIG. 4, the controlled oscillator O is a square-wave generator operating at a rated frequency $f = 3{,}596$ kHz which is the least common multiple of two desired carrier frequencies $f_1 = 124$ kHz and $f_2 = 116$ kHz. The output of oscillator O is stepped down in successive frequency dividers $D_1'$ of ratio 1:29 and $D_1''$ of ratio 1:31 so that the pulse train $i_1$ derived from the stepped-down wave $s_1''$ by differentiator $I_1$ has substantially the same cadence as the pulse train $i_o$ derived by differentiator $I_o$ from the base frequency $f_o = 4$ kHz generated by reference oscillator $O_o$. The square wave $s_1'$ produced by divider $D_1'$, having a fundamental frequency of 124 kHz, is passed through a gate $H_1$ and a low-pass filter $L_1$, stripping it of its harmonics, to an amplifier $A_1$ from which the sinusoidal carrier wave $f_1$ emerges. Another frequency divider $D_2$ steps down the output of oscillator O to produce a square wave $s_2$ which passes through a gate $H_2$ and a low-pass filter $L_2$ to an amplifier $A_2$ delivering the sinusoidal carrier wave $f_2$. Gates $H_1$ and $H_2$ are closed under the control of threshold device K if the voltage $v$ fed back to oscillator O should drop below or rise above its operating range as heretofore described.

Figure 5:
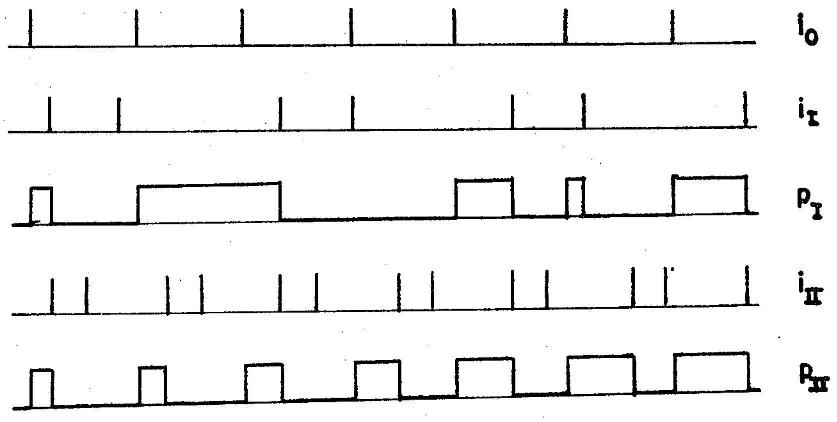
FIG. 5 is a set of graphs illustrating an alternate mode of operation.

The substantial parity of the cadences of the two pulse trains used for setting and resetting the flip-flop P is not an essential prerequisite for a proper functioning of our system. Thus, one of these cadences could be a low multiple of the other cadence, with ineffectual generation of one or more extra resetting pulses for each setting pulse or vice versa, though this would somewhat reduce the sensitivity of the phase comparator. If the test wave ($s$ in FIG. 2) is not square but has a pulse-to-gap ratio other than 1:1 (as could be the case if that wave were derived from the oscillator output not by straight division but by a combination of subharmonics as described in the above-identified copending application Ser.No. 36,026), and if the integrators $I_o$ and I work with full-wave rectification so as to generate two unipolar pulses during each cycle of the incoming square wave, the response of the flip-flop may become somewhat erratic as illustrated in FIG. 5. In that Figure it has been assumed that the lag of a train of test pulses $i_I$ behind the corresponding reference pulses $i_o$ progressively increases, yet the pairing of these test pulses results in irregular rather than progressively widening pulses $p_I$ in the output of the flip-flop. This problem can be countered by doubling the frequency of the controlled oscillator so that the cadence of the test pulses is also doubled as shown at $i_{II}$; the resulting flip-flop pulses $p_{II}$ then exhibit the expected behavior inasmuch as every second spike $i_{II}$ is now ineffectual.

The various components of the system described, including its binary divider stages and its phase comparator, can be readily realized by the technique of integrated digital circuitry.

Moreover, the system is largely unaffected by fluctuations in the amplitude of either the test signal or the reference signal applied thereto; in practice, these amplitude variations may be as high as 20 db without impairing its operation.

Finally, our system is immune from interference by low-frequency noise sources, such as the hum of its power supply of 50 or 60 Hz.

We claim:

1. A system for generating a plurality of stabilized carrier frequencies usable in multiplex communication, comprising:
   an adjustable generator for producing a limitedly variable operating frequency equaling a multiple of several carrier frequencies to be generated;
   a plurality of frequency dividers connected to the output of said adjustable generator for stepping down said operating frequency to said several carrier frequencies;
   a reference generator for producing a relatively low base frequency harmonically related to said operating frequency;
   frequency-dividing means in the output of said adjustable generator for deriving from said operating frequency a stepped-down frequency on the order of magnitude of said base frequency;
   first and second differentiation means respectively connected to said reference generator and to said frequency-dividing means for converting said base frequency and said stepped-down frequency into first and second pulse trains, respectively;
   a bistable element connected to said first and second differentiation means for setting and resetting by pulses from said first and second pulse trains, respectively;
   integrating means in the output of said bistable element for generating a control voltage varying with the relative phasing of the pulses of said first and second pulse trains; and
   feedback means connected between said integrating means and said adjustable generator for varying said operating frequency in response to said control voltage to maintain a predetermined phase relationship between the pulses of said first and second pulse trains.

2. A system as defined in claim 1 wherein at least one of said generators comprises a sine-wave oscillator followed by a squarer.

3. A system as defined in claim 1, further comprising threshold means controlled by said voltage for blocking the output of said adjustable generator upon said voltage falling outside a predetermined range.

4. A system as defined in claim 1 wherein said adjustable generator comprises a crystal-controlled oscillator with a range of adjustability slightly exceeding the drift range of said operating frequency.

5. A system as defined in claim 1 wherein said frequency-dividing means comprises a multistage binary frequency divider.

6. A system as defined in claim 1 wherein said frequency-dividing means includes one of said frequency dividers as a first stage thereof.

* * * * *